United States Patent
Chen et al.

(10) Patent No.: US 9,756,275 B2
(45) Date of Patent: Sep. 5, 2017

(54) IMAGE DISPLAY SYSTEM AND IMAGE PRESENTING METHOD THEREOF

(71) Applicant: Coretronic Corporation, Hsin-Chu (TW)

(72) Inventors: Yung-Chih Chen, Hsin-Chu (TW); Chi-Hsun Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 69 days.

(21) Appl. No.: 15/008,461

(22) Filed: Jan. 28, 2016

(65) Prior Publication Data
US 2016/0309111 A1 Oct. 20, 2016

(30) Foreign Application Priority Data
Apr. 17, 2015 (CN) .......................... 2015 1 0182747

(51) Int. Cl.
*H04N 5/45* (2011.01)

(52) U.S. Cl.
CPC ..................................... *H04N 5/45* (2013.01)

(58) Field of Classification Search
USPC ....... 348/565, 564, 569, 576, 588, 526, 513, 348/14.3, 14.14, 164, 22.1, 231.99, 274, 348/317, 421.1, 456, 464, 636, 734; 345/158, 168, 634; 725/37, 38, 46, 56, 725/53, 89, 93, 61
See application file for complete search history.

(56) References Cited

U.S. PATENT DOCUMENTS

| | | | | |
|---|---|---|---|---|
| 5,886,753 | A * | 3/1999 | Shinyagaito | H04L 29/06 348/114 |
| 6,504,628 | B1 * | 1/2003 | Kanno | H04N 1/56 358/515 |
| 7,864,249 | B2 | 1/2011 | Kim | |
| 8,249,414 | B2 | 8/2012 | Ackley et al. | |
| 2004/0263653 | A1 * | 12/2004 | Inada | G06T 1/0007 348/294 |
| 2005/0262258 | A1 * | 11/2005 | Kohno | H04N 7/17318 709/231 |

(Continued)

FOREIGN PATENT DOCUMENTS

| | | |
|---|---|---|
| CN | 102221959 | 10/2011 |
| TW | I279685 | 4/2007 |

*Primary Examiner* — Jefferey F Harold
*Assistant Examiner* — Mustafizur Rahman
(74) *Attorney, Agent, or Firm* — Jianq Chyun IP Office

(57) ABSTRACT

The invention provides an image display system and an image presenting method thereof. The image display system includes a display apparatus and an image presenting apparatus. The display apparatus receives an output image signal and generates an image frame. The image presenting apparatus obtains a plurality of input image signals from a plurality of image sources and generates an output image signal. The image presenting apparatus provides the output image signal to a display apparatus. The image presenting apparatus receives a preview request to simultaneously and timely present the input image signals of all the image sources in a preview block of the image frame. Also, the image presenting apparatus further receives a select request to generate the output image signal according to at least one of the input image signals that is selected.

13 Claims, 8 Drawing Sheets

(56) References Cited

U.S. PATENT DOCUMENTS

| | | | | |
|---|---|---|---|---|
| 2006/0056712 | A1* | 3/2006 | Endo | H04N 21/23433 382/232 |
| 2006/0064719 | A1* | 3/2006 | Youden | H04N 5/44591 725/38 |
| 2006/0133687 | A1* | 6/2006 | Ehrlich | G06T 5/009 382/254 |
| 2007/0035707 | A1* | 2/2007 | Margulis | G03B 21/26 353/122 |
| 2007/0236593 | A1* | 10/2007 | Yu | H04N 1/0044 348/333.01 |
| 2008/0172722 | A1* | 7/2008 | Fujita | H02G 3/00 726/4 |
| 2010/0013846 | A1* | 1/2010 | Choi | G09G 5/003 345/589 |
| 2010/0188714 | A1* | 7/2010 | Yamakawa | B41F 33/0036 358/504 |
| 2010/0306798 | A1* | 12/2010 | Ahn | H04N 5/445 725/38 |
| 2011/0061075 | A1* | 3/2011 | Lee | H04N 5/44591 725/46 |
| 2011/0227911 | A1* | 9/2011 | Joo | H04N 13/004 345/419 |
| 2014/0036108 | A1* | 2/2014 | Yoon | H04N 5/23229 348/231.99 |
| 2014/0368689 | A1* | 12/2014 | Cao | G06K 9/52 348/222.1 |
| 2015/0104143 | A1* | 4/2015 | Huang | H04N 21/2747 386/225 |
| 2015/0312618 | A1* | 10/2015 | McElhatten | H04N 5/44543 725/53 |
| 2015/0334255 | A1* | 11/2015 | Suzuki | H04N 1/00167 382/305 |
| 2016/0127764 | A1* | 5/2016 | Jung | H04N 1/00448 725/56 |

* cited by examiner

IMAGE DISPLAY SYSTEM AND IMAGE PRESENTING METHOD THEREOF

CROSS-REFERENCE TO RELATED APPLICATION

This application claims the priority benefit of China application serial no. 201510182747.8, filed on Apr. 17, 2015. The entirety of the above-mentioned patent application is hereby incorporated by reference herein and made a part of this specification.

BACKGROUND OF THE INVENTION

1. Field of the Invention

The invention relates to an image display system, and particularly relates to an image display system capable of timely previewing and selecting from a plurality of image sources and an image presenting method thereof.

2. Description of Related Art

As science and technology advance, the types of image sources provided to the image display system of the electronic apparatus become quite different. Thus, the user may constantly switch between different image sources, so as to meet his/her own requirements. Generally speaking, the way of switching between image sources provided in the conventional image display system has the following issues. First, the image frame of the image source is displayed after the user selects, making the user select a wrong image frame. Second, the preview function of displaying the real-time image frames of the image sources is not available. Thus, the user is unable to timely view the image frames of the image sources and is consequently unable to intuitively select the image source according to the image frame of the image source.

The description of related art merely serves to improve the understanding to the invention. Thus, some of the contents disclosed in this section may not constitute the common knowledge that people skilled in the art are familiar with. Disclosing contents in the description of related art does not indicate that such contents or the issue to be touched upon by one or more embodiments of the invention has been known or recognized by people skilled in the art.

SUMMARY OF THE INVENTION

The invention provides an image display system and an image presenting method thereof capable of simultaneously and timely previewing frames of a plurality of image sources. In addition, the user may select an image frame to be displayed by clicking on the timely preview image frames. Thus, the experience and efficiency of the user using the image display system are able to be improved.

An embodiment of the invention provides an image display system including a display apparatus and an image presenting apparatus. The display apparatus is configured to receive an output image signal and generates an image frame. The image presenting apparatus includes a signal receiving module, an image processing module, and a control unit. The signal receiving module obtains a plurality of input image signals from a plurality of image sources. The image processing module is coupled to the signal receiving module, receives the input image signals, and generates the output image signal according to at least one of the input image signals. The image processing module is coupled to the display apparatus and configured to provide the output image signal. The control unit is coupled to the image processing module and controls the image processing module. In addition, the control unit receives a preview request, so as to simultaneously and timely present the input image signals of all the image sources in a preview block of the image frame by using the image processing module. The control unit further receives a select request, so as to generate the output image signal according to at least one of the input image signals that is selected.

According to an embodiment of the invention, the image display system includes an input apparatus and the image presenting apparatus includes a decoder. The input apparatus generates an input signal and transmits the input signal to the decoder to decode the input signal and generate a decoded input signal. The control unit receives the decoded input signal to determine whether the preview request or the select request is received.

According to an embodiment of the invention, the input apparatus is a touch apparatus, an infrared remote control apparatus, or a keyboard.

According to an embodiment of the invention, the image processing module includes a plurality of image scalers and an adding unit. The image scalers respectively receive the input image signals and scale the input image signals, so as to generate a plurality of scaled image signals. The adding unit is coupled to the image scalers and performs an image processing process and an image adding process to the scaled image signals, so as to generate the output image signal.

According to an embodiment of the invention, the adding unit includes a plurality of image adders. the image adders respectively receive the scaled image signals and perform an image adding process to the scaled image signals, so as to generate the output image signal.

According to an embodiment of the invention, the number of the image sources is four, and the number of the image adders is the same as the number of the image sources.

According to an embodiment of the invention, the image processing module generates the output image signal according to one of a single frame display mode, a picture-in-picture display mode, and a picture-by-picture display mode.

According to an embodiment of the invention provides an image presenting method suitable for an image display system. The image display system includes a display apparatus and an image presenting apparatus. The display apparatus is configured to receive an output image signal and generates an image frame. The image presenting method includes: the image presenting apparatus obtaining a plurality of input image signals from a plurality of image sources; the image presenting apparatus generating the output image signal to the display apparatus according to at least one of the input image signals; and the image presenting apparatus determining whether a preview request is received, so as to simultaneously and timely present the input image signals of all the image sources in a preview block of the image frame.

According to an embodiment of the invention, the image presenting method further includes the image presenting apparatus receiving a select request to generate the output image signal according to at least one of the input image signals that is selected.

According to an embodiment of the invention, the image presenting method further includes the image presenting apparatus generating the output image signal according to one of a single frame display mode, a picture-in-picture display mode, and a picture-by-picture display mode.

According to an embodiment of the invention, when the output image signal indicates the picture-in-picture display mode, receiving the select request to generate the output image signal according to at least one of the input image signals that is selected includes: receiving a first select request to use as a first selected image source in a secondary frame block in the picture-in-picture display mode, the first selected image source being one of the image sources; receiving a second select request to use as a second selected image source in a primary frame block in the picture-in-picture display mode, the second selected image source being another of the image sources; and stopping displaying the preview block.

According to an embodiment of the invention, when the output image signal indicates the picture-by-picture display mode, receiving the select request to generate the output image signal according to at least one of the input image signals that is selected includes: receiving a first select request to use as a first selected image source in a first frame block in the picture-by-picture display mode, the first selected image source being one of the image sources; receiving a second select request to use as a second selected image source in a second frame block in the picture-by-picture display mode, the second selected image source being another of the image sources; and stopping displaying the preview block.

According to an embodiment of the invention, the image display system includes an input apparatus and the image presenting apparatus includes a decoder. The image presenting method further includes the input apparatus generating an input signal and transmitting the input signal to the decoder to decode the input signal, thereby generating a decoded input signal; and the image presenting apparatus determining whether the preview request or the select request is received according to the decoded input signal.

According to an embodiment of the invention, the input apparatus is a touch apparatus, an infrared remote control apparatus, or a keyboard.

According to an embodiment of the invention, the image presenting apparatus includes a plurality of image scalers and a plurality of image adders, the image adders are respectively coupled to the image scalers. The image presenting method further includes: the image scalers respectively receiving the input image signals and scaling the input image signals, so as to generate a plurality of scaled image signals; and the image adders respectively receiving the scaled image signals and performing an image adding process to the scaled image signals, so as to generate the output image signal.

According to the above, the image display system and the image presenting method thereof provided in the invention may obtain the plurality of input image signals from the plurality of image sources and allow the user to simultaneously and timely preview the input image signals of the image sources, so that the user may intuitively select the image source to be viewed and the experience and efficiency of the user using the image display system are able to be improved.

Other objectives, features and advantages of the invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The conventional image display system usually has difficulties in simultaneously and timely displaying preview image frames of a plurality of image sources, making it inconvenient for the user to operate the conventional image display system. The invention provides an image display system capable of timely displaying preview image frames of all the image sources. In addition, the user may intuitively select the image source to be viewed accordingly, so as to increase the convenience of the operation the image display system for the user. In order to make the invention more comprehensible, several embodiments are described below as the examples to prove that the invention can be practiced accordingly.

First Embodiment

Figure 1:
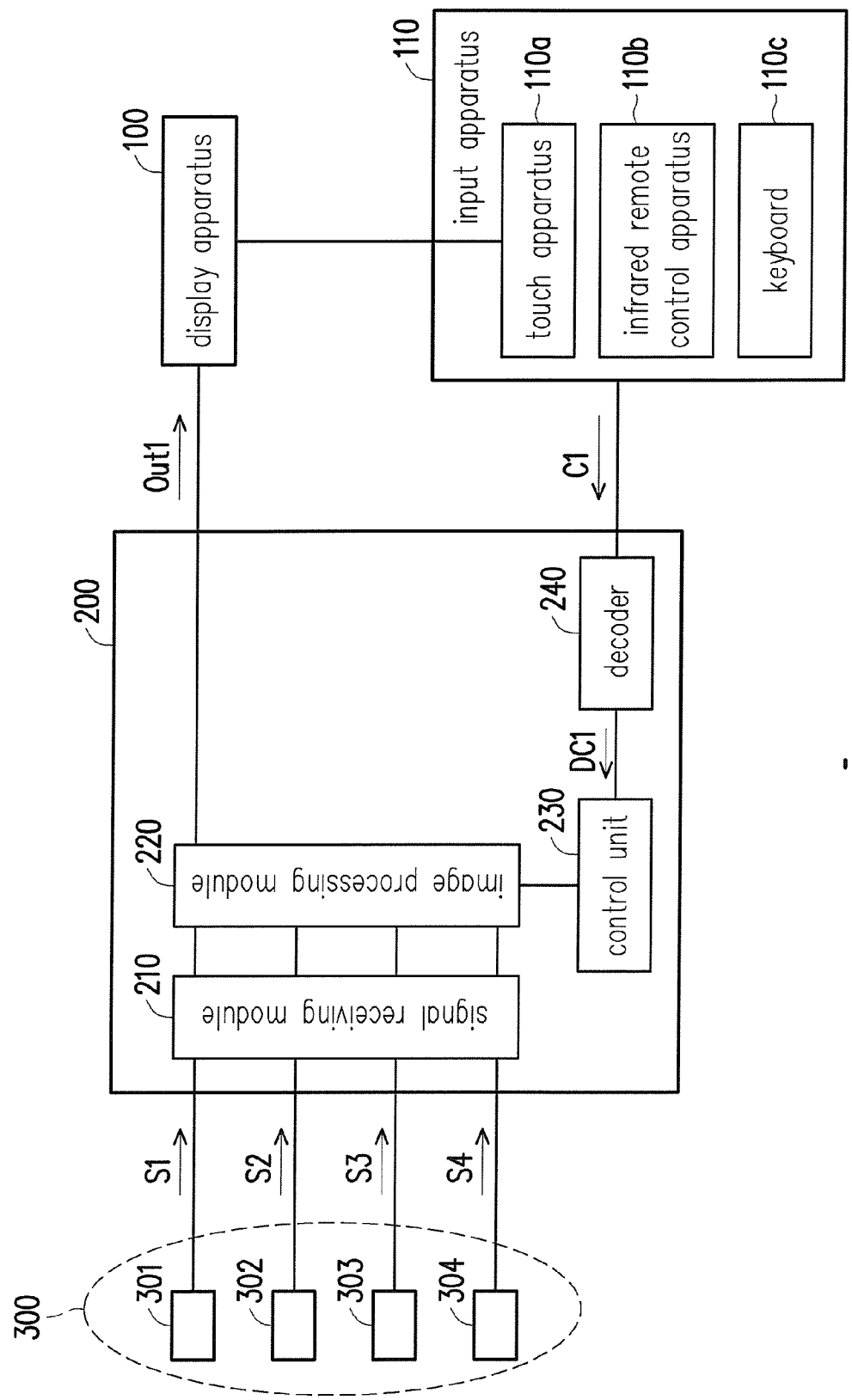
FIG. 1 is a block diagram illustrating an image display system according to a first embodiment of the invention.

FIG. 1 is a block diagram illustrating an image display system according to a first embodiment of the invention. Referring to FIG. 1, an image display system 10 includes a display apparatus 100 and an image presenting apparatus 200. The image presenting apparatus 200 is coupled to the display apparatus 100. The display apparatus 100 is configured to receive an output image signal Out1 from the image presenting apparatus 200 and generating a corresponding image frame.

In this embodiment, the display apparatus 100 is a projector, a cathode ray tube (CRT) display, a liquid crystal display (LCD), a plasma display, a light-emitting diode (LED) display, or a field emission display (FED), etc., for example. In addition, the display apparatus 100 further includes a display unit. The display unit is a projecting module within a projector for projecting an image, for example.

In this embodiment, the image display system 10 further includes an input apparatus 110 that generates an input signal in response to a user's input operation. The input apparatus 110 is coupled to the display apparatus 100 and the image presenting apparatus 200. The input apparatus 110 may be a touch apparatus 110a, an infrared remote control apparatus 110b, and/or a keyboard 110c. The input apparatus 110 is configured to allow the user to input an operating command. For example, the user may perform an input operation by clicking on the keyboard 110c, so as to generate an input signal, and the keyboard 110c may transmit a corresponding input signal to the image presenting apparatus 200. The touch apparatus 110a includes a touch pad, a touch button, a touch roller, and/or an interactive touch module, etc. However, it should be noted that the input apparatus 110 of the invention is not limited thereto. The input apparatus 110 may also include other suitable input apparatus. For example, in another embodiment, the input apparatus further includes a mouse, and the user may generate the input signal by operating the mouse.

For the ease of description, in the following embodiments, the touch apparatus 110a and the display apparatus 100 may be integrated to form a touch screen. The touch screen may be a screen having a touch function, such as a capacitive screen, a resistive screen, an acoustic wave screen, etc., or a display screen having a touch function after being integrated with other components. The touch apparatus 110a may also be an independent apparatus configured to form an invisible light curtain in front of a projecting screen, so as to provide an interactive touch function for the display apparatus 100 (projector). The touch apparatus 110a may be implemented by adopting a variety of touch-sensing technologies. The types of the touch apparatus 110a are not limited herein. For example, the user may generate an input signal C1 by clicking or sliding on the touch apparatus 110a using a finger, a touch pen, or a variety of touch input tools. If the input apparatus 110 is the touch apparatus 110a and/or the infrared remote control apparatus 110b, the input apparatus 110 may control the display apparatus 100 through a wire or wirelessly and provide the input signal C1 to the image presenting apparatus 200. If the input apparatus 110 is the keyboard 110c, the input apparatus 110 may be built in the image presenting apparatus 200, so as to directly provide the input signal C1 to the image presenting apparatus 200.

However, in other embodiments, the display apparatus 100 may also have other input modules to allow the user to input an operating command. For example, in other embodiments, the display apparatus 100 may have a data input module. The data input module may be connected to a data input apparatus (e.g., keyboard or mouse) via an interface or a built-in data input apparatus to generate an input signal and transmit the input signal to the image presenting apparatus 200.

Figure 2:
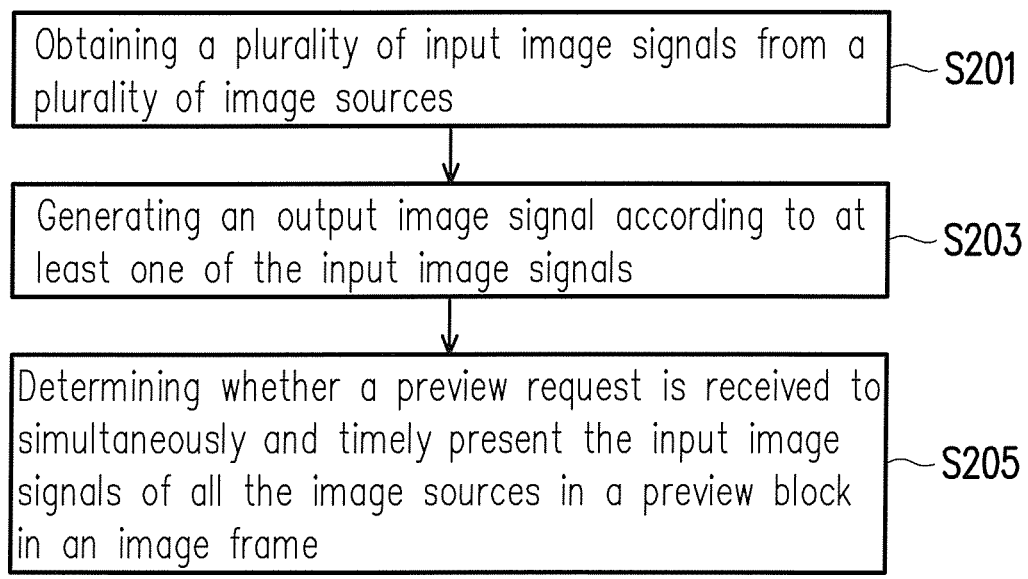
FIG. 2 is a flowchart illustrating an image presenting method according to the first embodiment of the invention.

FIG. 2 is a flowchart illustrating an image presenting method according to the first embodiment of the invention. Referring to FIG. 1 and FIG. 2 together, at Step S201, the image presenting apparatus 200 respectively obtains a plurality of input image signals S1 to S4 from a plurality of image sources 301 to 304. Here, the embodiment shown in FIG. 1 illustrates four image sources 301 to 304. It should be noted that the invention does not intend to limit the number and type of the image sources 300. The image sources 301 to 304 may be any electronic apparatus that may send the input image signals. For example, the image sources 300 may be a computer host, a laptop, a smart phone, a table computer, a server system, a video camera, an audiovisual player, etc.

For example, the image presenting apparatus 200 includes a signal receiving module 210, an image processing module 220, and a control unit 230. The image processing module 220 is coupled to the signal receiving module 210 and the display apparatus 100. The control unit 230 is coupled to the image processing module 220 and controls the image processing module 220.

The signal receiving module 210 receives the input image signals S1 to S4 from the image sources 301 to 304. The signal receiving module 210 is a physical circuit module having a plurality of connecting interfaces, for example, and the different image sources 301 to 304 may be connected to the signal receiving module 210 through different connecting interfaces, so as to transmit the input image signals S1 to S4. The connecting interfaces include interfaces compatible with the serial advanced technology attachment (SATA) standard, the parallel advanced technology attachment (PATA) standard, the Institute of Electrical and Electronic Engineers (IEEE) 1394 standard, the peripheral component interconnect (PCI) express standard, the universal serial bus (USB) standard, the video graphics array (VGA) standard, the digital visual interface (DVI) standard, the high definition multimedia interface (HDMI) standard, or other suitable standards (e.g., the standard of DisplayPort). However, the invention is not limited thereto. For example, in another embodiment, the manufacture may also design a communication standard and a physical structure (e.g., the number of pins in the interfaces or/and the function provided by each pin) of each connecting interface of the signal receiving module 210, so as to achieve the objective of the invention. Also, for example, the signal receiving module 210 further includes a wireless communication module (e.g., suitable wireless communication module such as a Bluetooth module, a Wi-Fi module, etc.,) configured to receive input image signals from other image sources through wireless communications established with other image sources.

The control unit 230 is a hardware component (e.g., a chipset, a processor, etc.,) having a computing capability. The control unit 230 is configured to control the overall operation of the image presenting apparatus 200. In this embodiment, the control unit 230 is a central processing unit (CPU), a micro-processor, other programmable micro-processors, digital signal processors (DSP), programmable controllers, application specific integrated circuits (ASIC), programmable logic devices (PLD), or other similar devices, for example.

At Step S203, the image presenting apparatus 200 generates the output image signal Out1 to the display apparatus 100 according to at least one of the input image signals S1 to S4.

Figure 3:
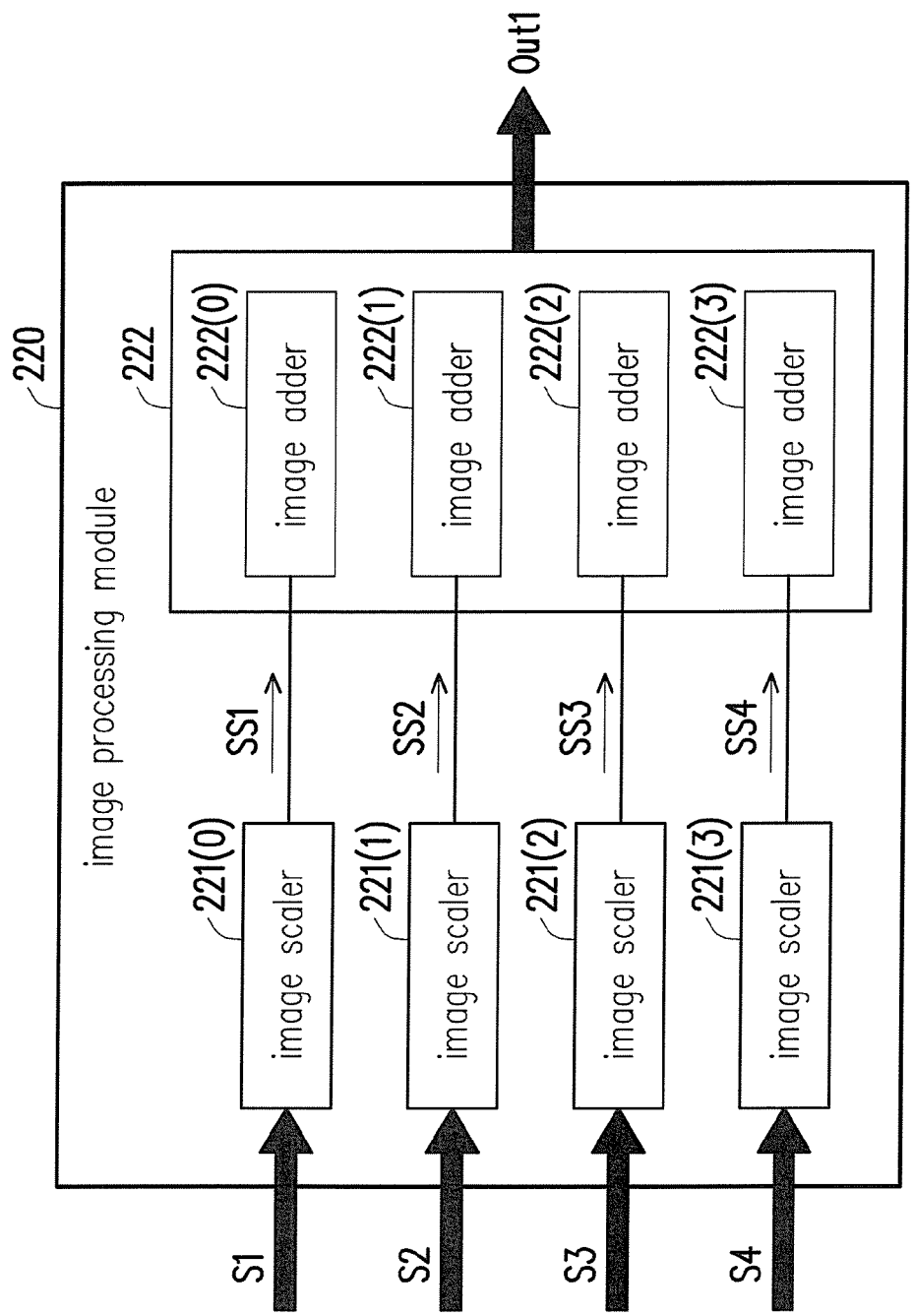
FIG. 3 is a block diagram illustrating an image processing module according to a first exemplary embodiment of the invention.

FIG. 3 is a block diagram illustrating the image processing module according to the first embodiment of the invention. Referring to FIG. 3, the image processing module 220 includes a plurality of image scalers 221(0) to 221(3) and an adding unit 222. The adding unit 222 is coupled to the image scalers 221(0) to 221(3).

The image processing module 220 is configured to receive the input image signals S1 to S4 from the signal receiving module 210, and generate the output image signal Out1 based on at least one of the received input image signals S1 to S4.

More specifically, the image scalers 221(0) to 221(3) respectively receive the input image signals S1 to S4 and scale the corresponding input image signals S1 to S4, so as to respectively generate a plurality of scaled image signals SS1 to SS4 and transmit the plurality of scaled image signals SS1 to SS4 to the adding unit 222. The adding unit 222 then performs an image processing process and an image adding process to the scaled image signals SS1 to SS4, so as to generate the output image signal Out1. More specifically, the adding unit 222 includes a plurality of image adders 222(0) to 222(3), and the image adders 222(0) to 222(3) respectively receive the scaled image signals SS1 to SS4 and perform the image adding process to the scaled image signals SS1 to SS4, so as to generate the output image Out1.

It should be noted that, in this embodiment, the number of the image sources 301 to 304 is four, and the number of the image adders or the image scalers is equal to the number of the image sources 301 to 304 (i.e., 4). However, the invention is not limited thereto. For example, in another embodiment, the number of the image sources 301 to 304 may be more or less than four, and the number of the image adders or the number of the image scalers may be equal or not equal to the number of image sources.

Moreover, the image processing module 220 may also generate the output image signal Out1 according to one of a single frame display mode, a picture-in-picture display mode, and a picture-by-picture display mode. Here, the first embodiment describes the operation that the image processing module 220 generates the output image signal Out1 according to the single frame display mode. Details concerning the operations that the image processing module 220 generates the output image signal Out1 according to the picture-in-picture display mode or the picture-by-picture display mode are respectively described in the second and third embodiments below.

Referring to FIG. 1 and FIG. 2, at Step S205, the image presenting apparatus 200 determines whether a preview request is received to simultaneously and timely display the input image signals S1 to S4 of the image sources 301 to 304 in a preview block in an image frame generated by the display apparatus 100.

More specifically, the image presenting apparatus 200 further includes a decoder 240. The decoder 240 is coupled to the control unit 230 and the input apparatus 110. The input apparatus 110 generates the input signal C1 based on the user's operation, and transmits the input signal C1 to the decoder 240 of the image presenting apparatus 200, so as to decode the input signal C1 and generate a decoded input signal DC1 to the control unit 230. The control unit 230 receives the decoded input signal DC1 from the decoder 240, so as to determine whether the preview request or a select request is received. When the control unit 230 determines that the preview request is received from the input apparatus 110 according to the input signal C1, the control unit 230 may simultaneously and timely present dynamic or static previews of the input image signals S1 to S4 of the image sources 301 to 304 in the preview block of the image frame of the display apparatus 100 by using the image processing module 220. In addition, when the control unit 230 determines that the select request is received from the input apparatus 110, the control unit 230 may generate the output image signal Out1 with at least one of the input image signals S1 to S4 that is selected. In the following, details of the operation that the control unit 230 displays the preview block according to the preview request and outputs the output image signal Out1 according to the select request.

Figure 4:
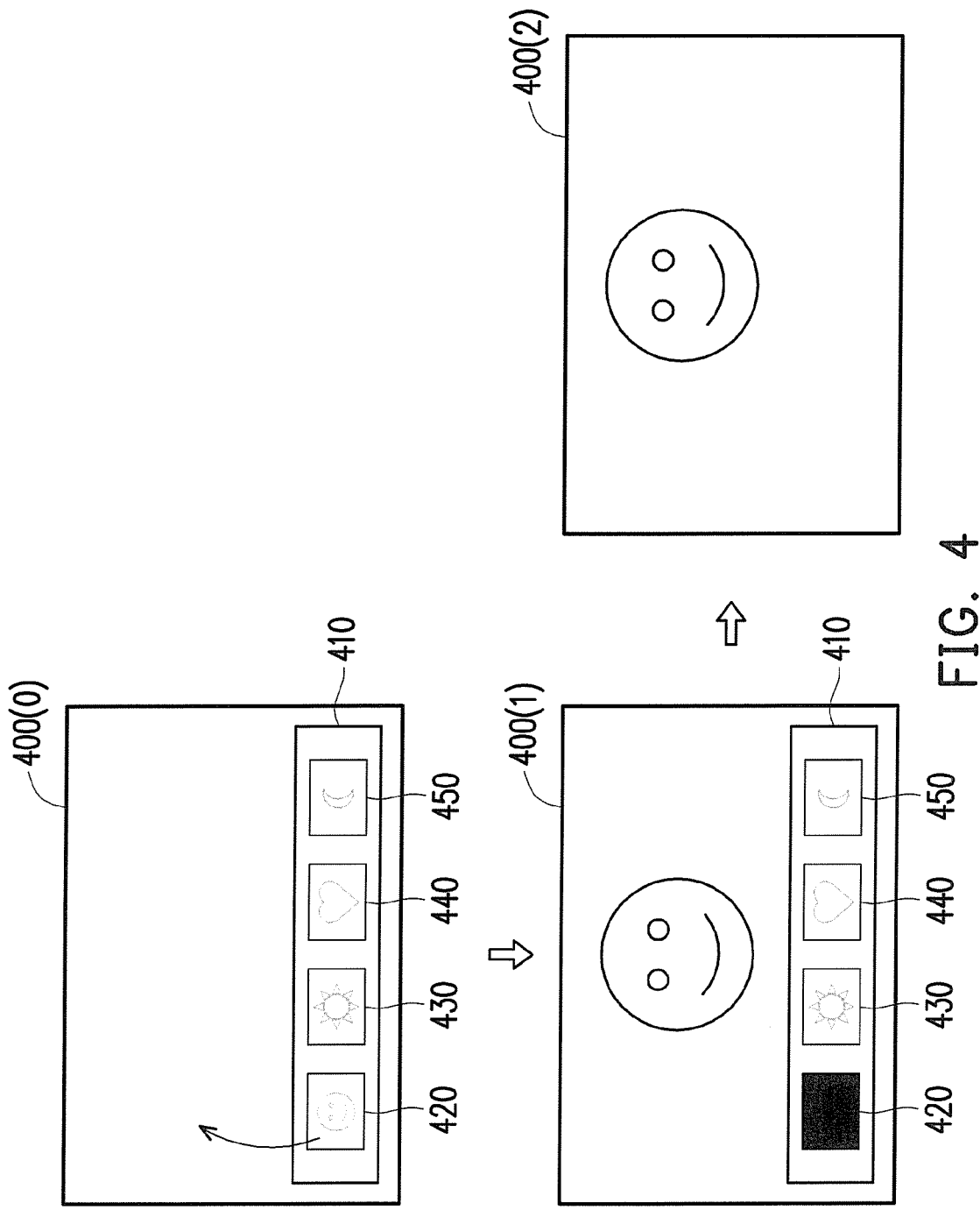
FIG. 4 is a schematic view illustrating an image selecting operation according to the first embodiment of the invention.

FIG. 4 is a schematic view illustrating an image selecting operation according to the first embodiment of the invention. Referring to FIG. 1, FIG. 3, and FIG. 4 together, the input apparatus 110 is assumed to be the touch apparatus 110a, and the user may perform the operation of previewing the image source (i.e., image preview operation) in the single frame display mode by performing a touch operation. The input apparatus 100 may send the input signal C1 to the decoder 240 of the image presenting apparatus 200 according to the image preview operation. In addition, the decoder 240 decodes the input signal C1 into a decoded input signal DC1, and the decoded input signal DC1 indicates the preview request. When the controller 230 receives the decoded input signal DC1 that indicates the preview request, the controller 230 may control the image processing module 230 to generate a preview row 410 (i.e., the preview block) in an image frame 400(0) displayed by the display apparatus 100. Also, the image processing module 220 may generate preview image frames 420 to 450 in the preview row 410 according to the received input image signals S1 to S4 respectively transmitted from the image sources 301 to 304. As shown in FIG. 4, the preview image frame 420 is a frame showing a "smiling face", the preview image frame 430 is a frame showing a "sun", the preview frame 440 is a frame showing a "heart", and the preview frame 450 is a frame showing a "moon".

In this embodiment, the preview image frames 420 to 450 respectively represent frames generated using the input image signals S1 to S4 received from the image sources 301 to 304. For example, if the image source 301 is directly coupled to another display apparatus, the display apparatus may display a frame showing the "smiling face" according to the input image signal S1 transmitted from the image source 301. It should be noted that, in this embodiment, the preview image frames 420 to 450 may simultaneously and timely change according to the input image signals S1 to S4. In other words, the preview image frames 420 and 450 are displayed respectively according to the input image signals S1 to S4 (e.g., the preview image frame 420 may simultaneously display the frame corresponding to the input image signal S1) simultaneously. The preview image frames 420 to 450 are not screenshots with respect to the frames of the input image signals S1 to S4, but are dynamic image frames respectively corresponding to the input image signals S1 to S4. Thus, the user may easily identify the image source to be selected according to the preview image frames 420 to 450 and display the image frame that the user intends to view on the display apparatus 100 accordingly.

As indicated above, the touch apparatus 110a and the display apparatus 100 (display) are integrated to form a touch screen, or the touch apparatus 110a and the display apparatus 100 (projector) are used together to form an invisible light curtain in front of the projecting screen. Here, it is assumed that the user performs a touch operation by using the touch apparatus 110a to perform an operation (i.e., image selecting operation) that selects the input image signal S1 of the image source 301 as the image frame displayed on the display apparatus 100. For example, the user clicks on the preview image frame 420 in the image frame 400(0). The touch apparatus 110a may send another input signal C1 to the decoder 240 of the image presenting apparatus 200 according to the image selecting operation of clicking on the preview image frame 420. The decoder 240 decodes the another input signal C1 into another decoded input signal DC1, and sends the another decoded input signal DC1 to the control unit 230. In addition, the another decoded input signal DC1 indicates a select request. The select request is particularly a select request for the image source 301 corresponding to the preview image frame 420. After the control unit 230 receives the another decoded input signal DC1, the control unit 230 may control the image processing module 220 according to the select request for the image source 301 corresponding to the preview image frame 420, so as to generate the output image signal Out1 according to the input image signal S1 corresponding to the selected image source 301.

In an image frame 400(1) in FIG. 4, the operation continues. The display apparatus 100 displays an image frame showing a "smiling face" according to the received output image signal Out1. It should be noted that, after the user clicks on the preview image frame 420 to display the image frame of the input image signal S1 corresponding to the image source 301, the preview image frame 420 originally displaying the preview image frame showing the "smiling face" becomes completely dark, such that the user is able to clearly identify that the selected preview image frame in the preview image frames 420 to 450 is the preview image frame 420. However, the invention is not limited thereto. For example, in other embodiments, the selected preview image frame 420 may be displayed in another way to allow the user to clearly identify the selected preview image frame.

It should be noted that, in an image frame 400(2) shown in FIG. 4, the user may perform another touch operation at any time, so as to stop the preview row 410 and terminate the whole image preview/selecting operation.

Hardware frameworks and components of the second and third embodiments in the following are similar to those of the first embodiment. Thus, like or similar components or operations are not reiterated in the following. Only the differences of the second (or third) embodiment from the first embodiment are described in the following.

Second Embodiment

Here, the second embodiment describes the operation that the image processing module 220 generates the output image signal Out1 according to the parallel frame display mode.

Figure 5:
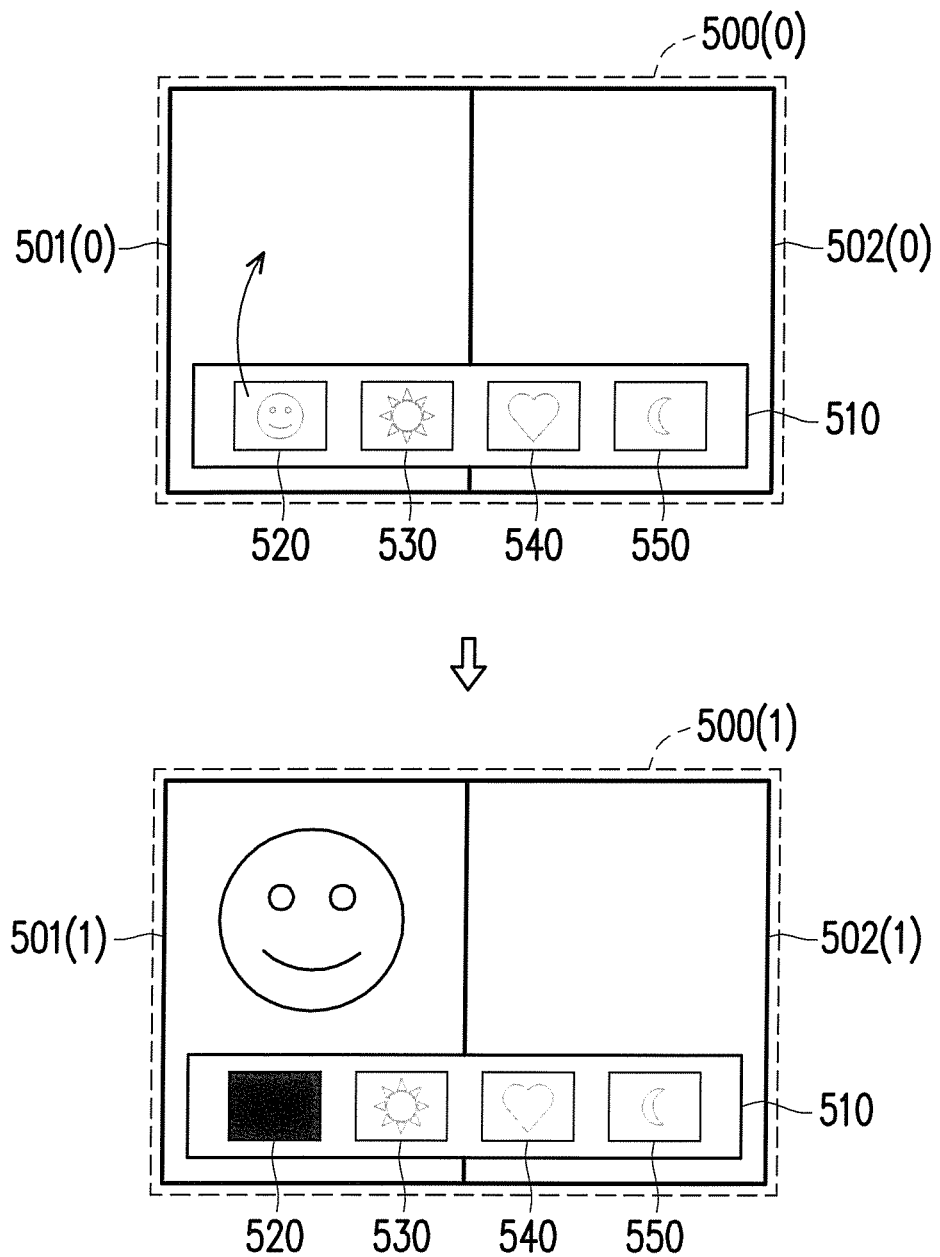
FIG. 5 is a schematic view illustrating an image selecting operation according to a second embodiment of the invention.

FIG. 5 is a schematic view illustrating an image selecting operation according to a second embodiment of the invention. Referring to FIG. 1, FIG. 3, and FIG. 5, it is assumed herein that the user intends to perform the image preview operation in the parallel frame display mode, and the image frame displayed by the display apparatus 100 is an image frame 500(0) shown in FIG. 5. The image frame 500(0) is divided into a first frame block (i.e., frame 501(0)) and a second frame block (i.e., frame 502(0)) that are parallel, and a preview row 510 (i.e., the preview block) is generated at the lower part of the frame 500(0) through the image preview operation. In addition, the preview row 510 has four preview frames 520 to 550. The preview image frames 520 to 550 respectively correspond to the input image signals S1 to S4 from the image sources 301 to 304.

Here, it is assumed that the user firstly selects the preview image frame 520. The control unit 230 may receive the decoded input signal DC1 having a first select request, and the control unit 230 may control the image processing module 220 to display the image frame in the first frame block according to the input image signal S1 corresponding to the preview image frame 520. In this embodiment, the image scalers respectively receive and scale the input image signals to generate the corresponding scaled image signals. In addition, the image adders receive the corresponding scaled image signals and perform the image adding process to the scaled image signals, so as to generate the output image signal. For example, the control unit 230 may control the image scaler 221(0) corresponding to the input image signal S1 to scale the input image signal S1 in correspondence with a size of the first frame block, so as to generate the scaled image signal SS1. The image adder 222(0) performs the image adding process to the received scaled image signal SS1, so as to generate the output image signal Out1, thereby displaying the image frame 500(1) shown in FIG. 5.

It should be noted that the frame showing "smiling face" displayed in the image frame 501(1) is adjusted to be adapted to the first frame block (e.g., the size of the image frame 501(1)) by using the image scaler 221(0), and is assigned to the position of the image frame 501(1) by using the adding unit 222. Besides, the frame displayed as the image frame 501(1) also timely changes in correspondence with the input image signal S1, and may be considered to be that the input image signal S1 from the image source 301 is directly displayed in the first frame block. Since the user does not start the image selecting operation again, an image frame 502(1) does not display a frame corresponding to the image selecting operation performed by the user again. In other words, the output image signal Out1 at this time only displays the image frame 501(1) in the first frame block.

After the user selects the image source of the first frame block, as shown in FIG. 5, the image frame 501(1) displays the frame showing "smiling face", and the preview image frame 520 becomes dark (as shown in the preview image frame 520 in FIG. 5).

Figure 6:
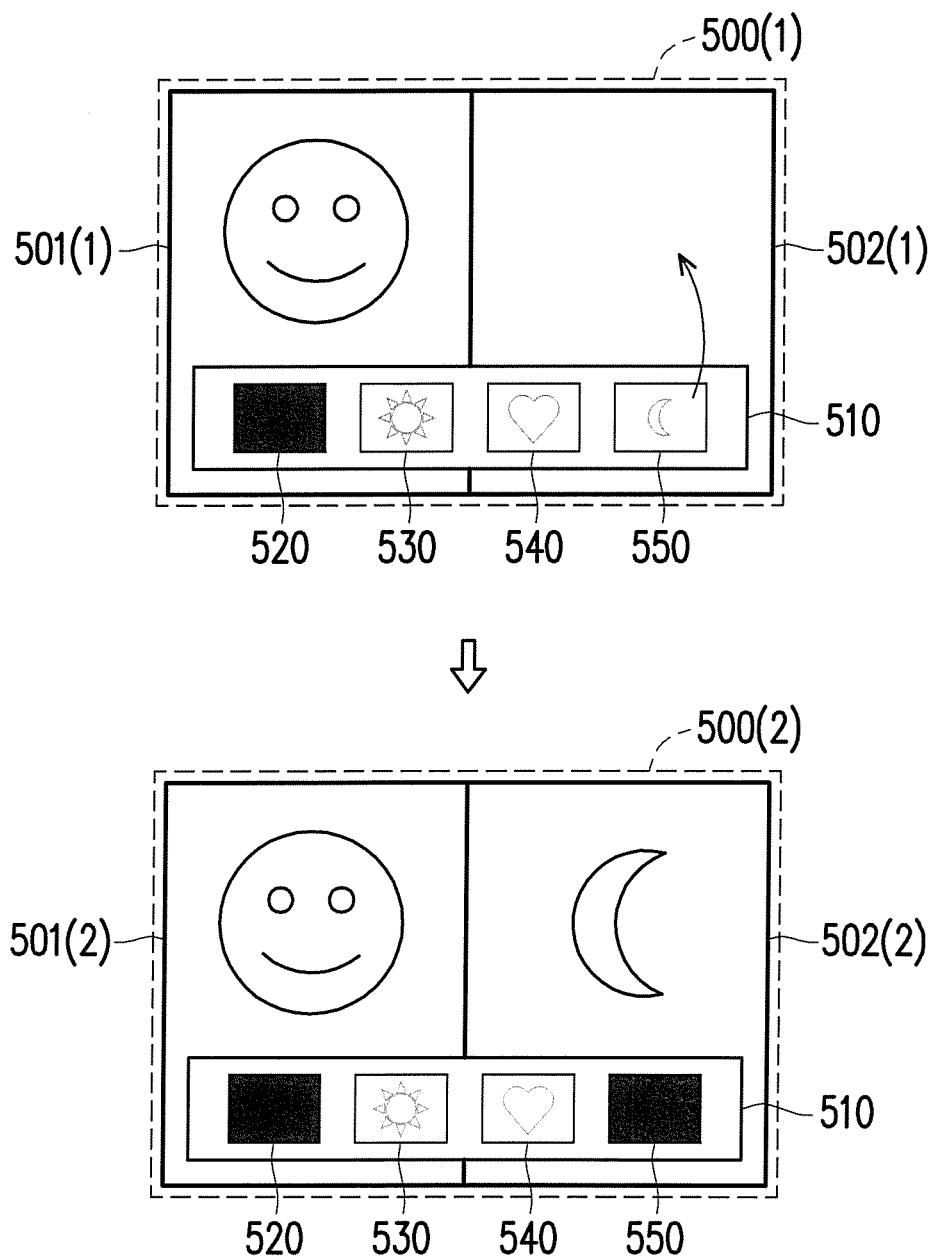
FIG. 6 is a schematic view illustrating an image selecting operation according to the second embodiment of the invention.

FIG. 6 is a schematic view illustrating an image selecting operation according to the second embodiment of the invention. Referring FIG. 1, FIG. 3, and FIG. 6, it is assumed herein that the user further selects the preview image frame 550 after the example of FIG. 5. The control unit 230 may receive the decoded input signal DC1 having a second select request, and the control unit 230 may control the image processing module 220 to display the image frame in the second frame block according to the input image signal S4 corresponding to the preview image frame 550. As described above, the controller 230 may scale the input image signal S1 in correspondence with the size of the first frame block according to the image scaler 221(0) corresponding to the input image signal S1 in correspondence with the image selecting operation previously performed by the user, so as to generate the scaled image signal SS1, and may further scale the input image signal S4 in correspondence with a size of the second frame block according to the image scaler 221(3) corresponding to the input image signal S4 in correspondence with the image selecting operation currently performed by the user, so as to generate the scaled image signal SS4. In addition, the image adders 222(0) and 222(3) may respectively perform the image adding process to the received scaled image signals SS1 and SS4, so as to generate the output image signal Out1, thereby displaying the image frame 500(2) shown in FIG. 6. It should be noted that the frame showing "moon" displayed in the image frame 502(2) is adjusted to be adapted to the second frame block (e.g., the size of the image frame 502(2)) by using the image scaler 221(3), and is assigned to the position of the image frame 502(2) by using the adding unit 222. Besides, the frame displayed as the image frame 502(2) also timely changes in correspondence with the input image signal S4, and may be considered to be that the input image signal S4 from the image source 304 is directly displayed in the second frame block.

After the user selects the image source of the second frame block, as shown in FIG. 6, the image frame 502(2) displays the frame of "moon", and the preview image frame 550 becomes dark (as shown in the preview image frame 550 in FIG. 6). Then, as described in the first embodiment, the user may stop the preview row 510 and terminate the whole image preview/selecting operation.

It should be noted that, in this embodiment, if the display apparatus is in a state of displaying the image frame 500(2) (e.g., when the image sources of two parallel frame blocks are already selected), and the user further selects the preview image frame 530, the control unit 230 may output the frame to the first frame block (i.e., the image frame 501(2)) according to the input image signal S2 of the preview image frame 530, make the preview image frame 530 dark, and restore the preview image frame 520 from the dark frame to the frame corresponding to the input image signal S1. In other words, when the preview row 510 is not stopped, if the user further selects one of the preview image frames 520 to 550, the first frame block and the second frame block may sequentially display the image frames of the image sources 301 to 304 selected by the user according to above.

In addition, even though the first frame block may firstly respond to the user's first image selecting operation performed to the preview image frame and the second image block may respond to the user's second image selecting operation performed to the preview image frame, the invention is not limited thereto. For example, in another embodiment, the second frame block may firstly respond to the user's first image selecting operation performed to the preview image frame, and the first frame block may subsequently respond to the user's second image selecting operation performed to the preview image frame.

Third Embodiment

The third embodiment is similar to the second embodiment. The difference therebetween lies that the third embodiment mainly describes the operation that the image processing module 220 generates the output image signal Out1 according to the picture-in-picture display mode.

Figure 7:
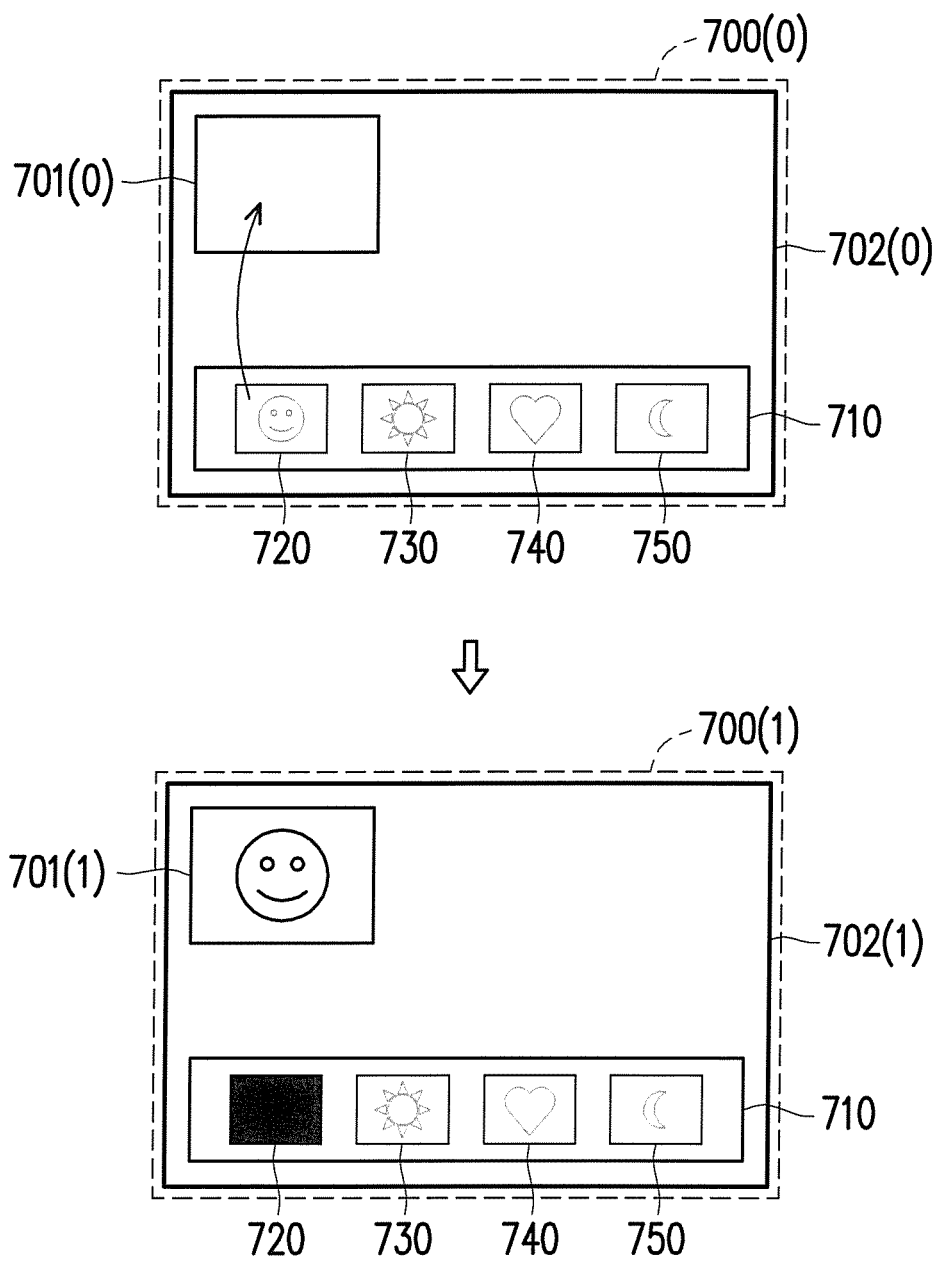
FIG. 7 is a schematic view illustrating an image selecting operation according to a third embodiment of the invention.

FIG. 7 is a schematic view illustrating an image selecting operation according to a third embodiment of the invention. Referring to FIG. 1, FIG. 3, and FIG. 7, it is assumed herein that the user intends to perform the image preview operation in the picture-in-picture display mode, and the frame displayed by the display apparatus 100 is an image frame 700(0) shown in FIG. 7. The image frame 700(0) is divided into frame blocks of difference sizes, and includes the first frame block (i.e., frame 701(0)) that is smaller and the second frame block (i.e., frame 702(0)) that is larger, and a preview row 710 (i.e., the preview block) is generated at the lower part of the image frame 700(0) through the image preview operation. In addition, the preview row 710 has four preview image frames 720 to 750. The preview image frames 720 to 750 respectively correspond to the input image signals S1 to S4 from the image sources 301 to 304. It should be noted that, if a secondary frame block in the picture-in-picture display mode in the third embodiment is considered as the first frame block in the second embodiment, and the primary frame block in the picture-in-picture display mode in the third embodiment is considered as the second frame block in the second embodiment, the operation of the third embodiment is similar to the operation of the second embodiment. Thus, repeated details will not be reiterated in the following.

For example, referring to FIG. 7, it is assumed herein that the user firstly selects the preview image frame 720 from the preview row 710 shown on the image frame 700(0). Corresponding to the user's image selecting operation, the control unit 230 may display the secondary frame block as an image frame (i.e., frame 701(1)) corresponding to the image source 301 corresponding to the preview image frame 720. It should be noted that, similar to the second embodiment, the frame showing "smiling face" displayed in the image frame 701(1) is adjusted to be adapted to the secondary frame block (e.g., the size of the image frame 701(1)) by using the image scaler 221(0), and is assigned to the position of the image frame 701(1) by using the adding unit 222. Besides, the frame displayed as the image frame 701(1) also timely changes in correspondence with the input image signal S1, and may be considered to be that the input image signal S1 from the image source 301 is directly displayed in the secondary frame block. Since the user does not start the image selecting operation again, an image frame 702(1) does not display a frame corresponding to the image selecting operation performed by the user again. In other words, the display apparatus 100 receiving the output image signal Out1 only displays an image frame displaying the secondary frame block at this time. In addition, after the user selects the image source of the secondary frame block, as shown in FIG. 7, the image frame 701(1) displays the frame showing "smiling face", and the preview image frame 720 becomes dark.

Figure 8:
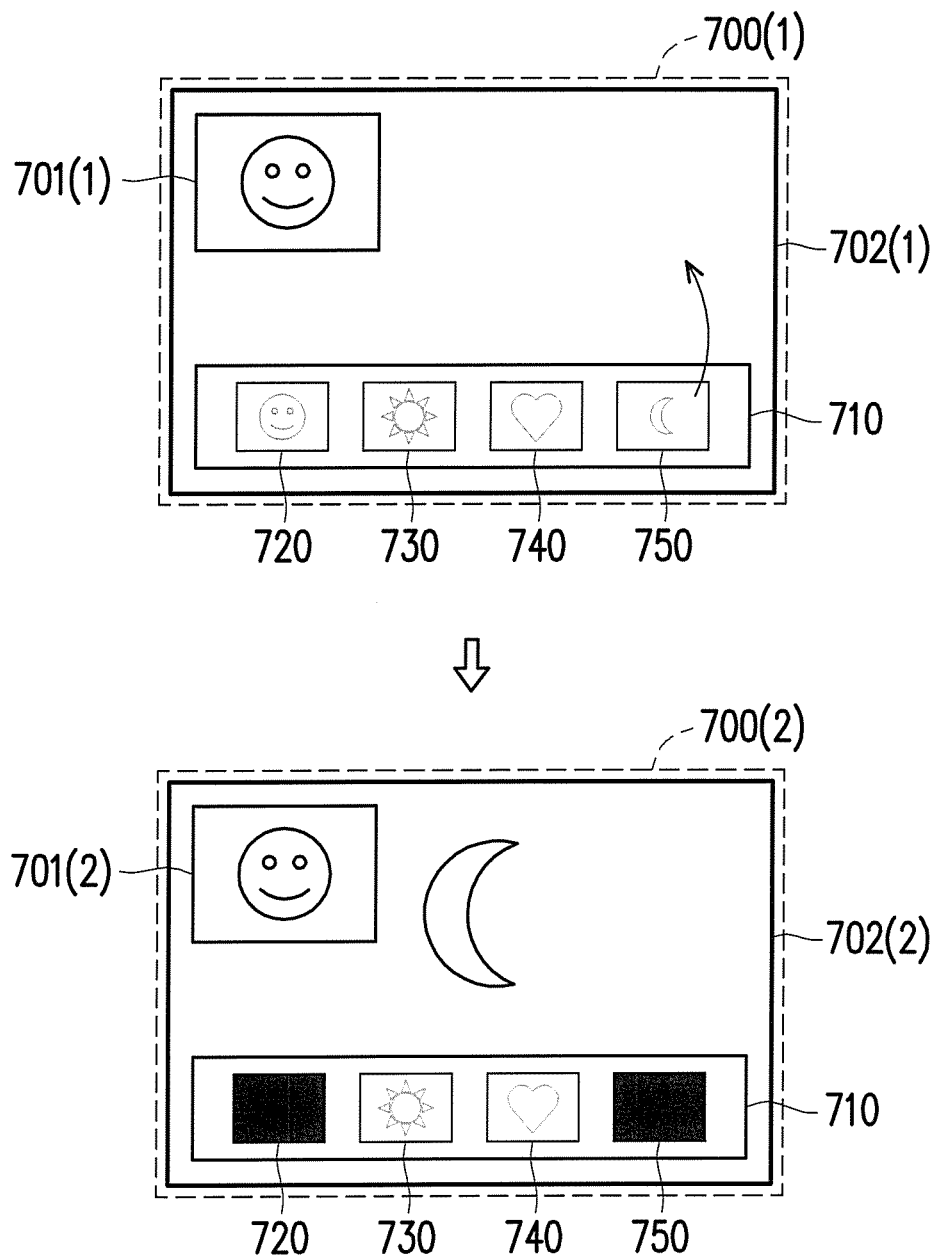
FIG. 8 is a schematic view illustrating an image selecting operation according to the third embodiment of the invention.

FIG. 8 is a schematic view illustrating an image selecting operation according to the third embodiment of the invention. Referring FIG. 1, FIG. 3, and FIG. 8, it is assumed herein that the user further selects the preview image frame 750 after the example of FIG. 7. The control unit 230 may receive the decoded input signal DC1 having a second select request, and the control unit 230 may control the image processing module 220 to display the image frame in the primary frame block according to the input image signal S4 corresponding to the preview image frame 750. Namely, after the user selects the image source of the primary frame block, as shown in FIG. 8, the image frame 702(2) displays the image frame showing "moon", and the preview image frame 750 becomes dark. Then, as described in the first embodiment, the user may stop the preview row 710 and terminate the whole image preview/selecting operation.

It should be noted that, in this embodiment, if the display apparatus is in a state of displaying the image frame 700(2) (e.g., when the image sources of two frame blocks are selected), and the user further selects the preview image frame 730, the control unit 230 may output the frame to the image frame 701(2) (i.e., the secondary frame block) according to the input image signal S2 of the preview image frame 730, make the preview image frame 730 completely dark, and restore the preview image frame 720 from the dark frame to the frame corresponding to the input image signal S1. In other words, when the preview row 710 is not stopped, if the user further selects one preview image frame, the primary frame block and the secondary frame block may sequentially display the image frames of the image sources selected by the user according to above.

In addition, even though the secondary frame block may firstly respond to the user's first image selecting operation performed to the preview image frame and the primary frame block may subsequently respond to the user's second image selecting operation performed to the preview image frame, the invention is not limited thereto. For example, in another embodiment, the primary frame block may firstly respond to the user's first image selecting operation performed to the preview image frame, and the secondary frame block may subsequently respond to the user's second image selecting operation performed to the preview image frame.

It should also be noted that, in the embodiments, the image processing module 220 may generate the output image signal Out1 according to one of the single frame display mode, the picture-in-picture display mode, and the picture-by-picture display mode, but the invention is not limited thereto. In other words, the image processing module 220 may generate the corresponding output image signal according to different display modes of the image display system 10 based on the manufacturer's design of the image display system 10. Also, the user's interface or image frame (e.g., preview row, preview image frame, picture-in-picture, and picture-by-picture) of the display unit of the display apparatus 100 shown in the embodiments are merely provided for an illustrative purpose, and should not serve to limit the invention.

Moreover, in the embodiments, the display apparatus 100 and the image presenting apparatus 200 are independent apparatuses. However, the invention is not limited thereto. For example, in another embodiment, the image presenting apparatus 200 may also be integrated into the display apparatus 100.

In view of the foregoing, the image display system and the image presenting method thereof provided in the invention may obtain the plurality of input image signals from the plurality of image sources and allow the user to simultaneously and timely preview the input image signals of the image sources, so that the user may intuitively select the image source to be viewed and the experience and efficiency of the user using the image display system are able to be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image display system, comprising a display apparatus and an image presenting apparatus, wherein the display apparatus is configured to receive an output image signal and generate an image frame, and the image display apparatus comprises:
   a signal receiving module, obtaining a plurality of input image signals from a plurality of image sources outside the image presenting apparatus;
   an image processing module, coupled to the signal receiving module, receiving the input image signals, and generating the output image signal according to at least one of the input image signals, wherein the image processing module is coupled to the display apparatus to provide the output image signal; and
   a control unit, coupled to and controlling the image processing module,
   wherein the control unit receives a preview request, so as to simultaneously and timely present the input image signals of all the image sources in a preview block of the image frame by using the image processing module, and the control unit further receives a select request, so as to generate the output image signal according to at least one of the input image signals that is selected,
   wherein the image display system further comprises an input apparatus and the image presenting apparatus comprises a decoder, wherein the input apparatus generates an input signal and transmits the input signal to the decoder to decode the input signal and generate a decoded input signal, and the control unit receives the decoded input signal to determine whether the preview request or the select request is received.

2. The image display system as claimed in claim 1, wherein the input apparatus is a touch apparatus, an infrared remote control apparatus, or a keyboard.

3. The image display system as claimed in claim 1, wherein the image processing module comprises:

a plurality of image scalers, wherein the image scalers respectively receive the input image signals and scale the input image signals, so as to generate one of a plurality of scaled image signals; and an adding unit, coupled to the image scalers and performing an image processing process and an image adding process to the scaled image signals, so as to generate the output image signal.

4. The image display system as claimed in claim 1, wherein the adding unit comprises:

a plurality of image adders, wherein the image adders respectively receive the scaled image signals and performs an image adding process to the scaled image signals, so as to generate the output image signal.

5. The image display system as claimed in claim 4, wherein the number of the image sources is four, and the number of the image adders is the same as the number of the image sources.

6. The image display system as claimed in claim 1, wherein the image processing module generates the output image signal according to one of a single frame display mode, a picture-in-picture display mode, and a picture-by-picture display mode.

7. An image presenting method for an image display system, wherein the image display system comprises a display apparatus and an image presenting apparatus, the display apparatus is configured to receive an output image signal and generate an image frame, and the image presenting method comprises:

the image presenting apparatus obtaining a plurality of input image signals from a plurality of image sources outside the image presenting apparatus;

the image presenting apparatus generating the output image signal to the display apparatus according to at least one of the input image signals; and the image presenting apparatus determining whether a preview request is received, so as to simultaneously and timely present the input image signals of all the image sources in a preview block of the image frame, wherein the image display system further comprises an input apparatus, the image presenting apparatus comprises a decoder, and the image presenting method further comprises:

the input apparatus generating an input signal and transmitting the input signal to the decoder to decode the input signal, thereby generating a decoded input signal; and the image presenting apparatus determining whether the preview request or the select request is received according to the decoded input signal.

8. The image presenting method as claimed in claim 7, further comprising:

the image presenting apparatus receiving a select request to generate the output image signal according to at least one of the input image signals that is selected.

9. The image presenting method as claimed in claim 7, further comprising:

the image presenting apparatus generating the output image signal according to one of a single frame display mode, a picture-in-picture display mode, and a picture-by-picture display mode.

10. The image presenting method as claimed in claim 9, wherein when the output image signal indicates the picture-in-picture display mode, receiving the select request to generate the output image signal according to at least one of the input image signals that is selected comprises:

receiving a first select request to use as a first selected image source in a secondary frame block in the picture-in-picture display mode, wherein the first selected image source is one of the image sources;

receiving a second select request to use as a second selected image source in a primary frame block in the picture-in-picture display mode, wherein the second selected image source is another of the image sources; and stopping displaying the preview block.

11. The image presenting method as claimed in claim 9, wherein when the output image signal is in the picture-by-picture display mode, receiving the select request to generate the output image signal according to at least one of the input image signals that is selected comprises:

receiving a first select request to use as a first selected image source in a first frame block in the picture-by-picture display mode, wherein the first selected image source is one of the image sources;

receiving a second select request to use as a second selected image source in a second frame block in the picture-by-picture display mode, wherein the second selected image source is another of the image sources; and stopping displaying the preview block.

12. The image presenting method as claimed in claim 7, wherein the input apparatus is a touch apparatus, an infrared remote control apparatus, or a keyboard.

13. The image presenting method as claimed in claim 7, wherein the image presenting apparatus comprises a plurality of image scalers and a plurality of image adders, the image adders are respectively coupled to the image scalers, and the image presenting method further comprises:

the image scalers respectively receiving the input image signals and scaling the input image signals, so as to generate a plurality of scaled image signals; and the image adders respectively receiving the scaled image signals and performing an image adding process to the scaled image signals, so as to generate the output image signal.

* * * * *